United States Patent [19]

Scheidweiler

[11] 4,193,541
[45] Mar. 18, 1980

[54] DAMPER LATCH

[75] Inventor: A. Lee Scheidweiler, Englewood, Ohio

[73] Assignee: Energy Vent, Inc., Dayton, Ohio

[21] Appl. No.: 946,594

[22] Filed: Sep. 28, 1978

Related U.S. Application Data

[63] Continuation of Ser. No. 890,082, Mar. 27, 1978, abandoned.

[51] Int. Cl.² ............................................. G05D 23/00
[52] U.S. Cl. ................................... 236/1 G; 431/20; 251/133; 251/38; 251/284; 126/285 B
[58] Field of Search ............... 236/1 G; 431/20; 126/285 R, 285 B, 293, 295; 251/129, 133, 284, 138

[56] References Cited

U.S. PATENT DOCUMENTS

| | | | |
|---|---|---|---|
| 2,224,705 | 12/1940 | Stringer | 431/20 |
| 3,273,625 | 9/1966 | Holtzman et al. | 126/293 |
| 3,580,238 | 5/1971 | Diehl | 126/295 |
| 3,738,388 | 6/1973 | Parker et al. | 251/138 |
| 3,934,796 | 1/1976 | Smith, Jr. et al. | 251/138 |
| 4,017,026 | 4/1977 | Felter | 236/1 G |
| 4,039,123 | 8/1977 | Frankel | 126/285 B |
| 4,046,318 | 9/1977 | Ripley | 126/285 B |

*Primary Examiner*—James C. Yeung
*Attorney, Agent, or Firm*—Dybvig & Dybvig

[57] ABSTRACT

An automatic flue damper positioned respectively to open and closed positions by means of motive apparatus, such as a solenoid motor, is provided with mechanical means for automatically latching the damper in its open position.

11 Claims, 4 Drawing Figures

DAMPER LATCH

This is a continuation of application Ser. No. 890,082, filed Mar. 27, 1978 for Damper Latch, now abandoned.

BACKGROUND OF THE INVENTION

1. Field of the Invention

This invention relates to mechanism for latching a damper plate to prevent movements thereof which may produce irregular and undesired circuit operation, and, more particularly, to means for automatically latching the damper when moved to its open position and for automatically releasing the damper latch upon the initiation of forces for moving the damper to its closed position; however, this invention is not necessarily so limited.

2. Prior Art

U.S. Pat. No. 3,580,238, issued to Diehl, is representative of prior art damper devices in which a flue damper is biased to a closed position by yieldable means, such as a spring, and electrically driven to an open position by motive means, such as a solenoid. A difficulty with such devices is that upon a power failure, the damper apparatus fails to a closed position with the result that the damper mechanism may block the release to the atmosphere of combustion products which are desired to escape the flue being regulated. U.S. Pat. No. 4,039,123, issued to Frankel, is representative of various prior art devices which overcome the limitations of the aforementioned Diehl patent by causing a yieldable means or spring to bias the damper to an open position, with the result that upon any power failure the damper mechanism fails open, thus releasing any combustion products not yet exhausted.

In devices of the fail-open type, a yieldable means, such as a spring, holds a damper plate in an open position. Frequently, however, the open position is an unstable position, with the result that the damper plate may bounce or chatter and thereby undesirably affect associated control circuitry.

SUMMARY OF THE INVENTION

The present invention is concerned with damper mechanisms of the fail-open type and, in order to prevent vibration or chatter, the damper is latched in its open position. An electrically energized motive means, such as a solenoid, is provided with a lost motion connection to the damper plate. The lost motion occurs between the time the solenoid is initially energized to close the damper plate and the time an exhaustion of the lost motion causes the solenoid to commence closure of the damper plate. During the aforementioned interval of lost motion, a latch plate, directly driven by the solenoid armature without the lost motion moves to extract a detent from interlocking engagement with a cam carried by the damper plate, thus to release the damper plate before the remaining stroke of the solenoid armature commences to drive the damper plate to its closed position. Upon a subsequent de-energization of the solenoid, so as to allow a yieldable spring to return the damper plate to its open position, the lost motion, which occurred immediately preceding closure of the damper plate, is built back into the mechanism by reason of a larger than necessary return stroke of the yieldable spring.

A second loss of motion built into the latch mechanism of the present invention allows the latch plate to rotate about a first axis and the cam, driven by the solenoid, to rotate about a second axis without a binding interference occurring as a result of such rotations. The first mentioned lost motion and the second mentioned lost motion both occur with respect to a common armature pin, but occur at different positions along the axis of the armature pin.

It is accordingly an object of the present invention to provide a latch mechanism for restraining chatter of a damper plate normally biased open.

Another object of the present invention is to provide a damper plate latch which is subject to the control of a damper plate positioning mechanism, such as a solenoid.

A further object of the present invention is to combine a damper plate positioning means and a damper plate latch means in a new and improved compact configuration.

DESCRIPTION OF THE PREFERRED EMBODIMENT

Figure 1:
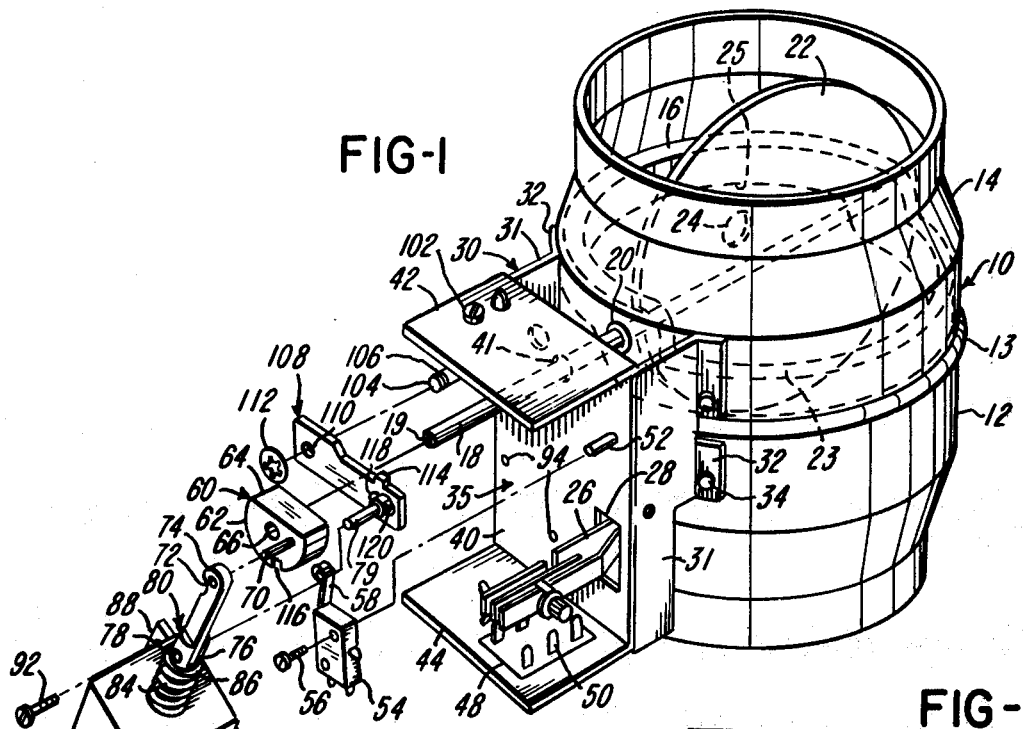
FIG. 1 is an exploded perspective view illustrating a vent damper mechanism and damper latch means in accordance with the present invention.

FIG. 1 illustrates a vent damper mechanism constructed in accordance with the present invention. The damper mechanism comprises a housing 10 formed of two parts; namely, a lower part 12 surrounded by a reinforcing bead 13 and an upper part 14. This two-part housing assembly is preferably adapted for retrofit installation of the housing 10 into an existing vent stack, such as is typically present on pre-existing houses, apartments and the like, and for original equipment installation into new houses, factories, apartments, and the like.

Assembled within the upper housing part 14 is an annular one piece circumferentially stepped ring 16 crossed diametrically by a damper shaft 18 journaled in suitable bearings, such as the bearing 20 appearing in FIG. 1. Affixed to the shaft 18 as by rivets, not illustrated, is a generally circular damper plate 22 having diametrically disposed notches, not detailed in the drawing, which enable the damper plate 22 to rest in a closed position wherein the upper periphery of the damper plate 22, as it appears in FIG. 1, will rest upon a lower step 23 of the annular ring 16, while the lower periphery of the plate 22 will rest under a diametrically opposite upper step 25 of the ring 16.

It can be noted that the damper shaft 18 terminates at the end thereof, which appears in FIG. 1, with a notch 19, which enables screwdriver-type adjustments of the damper plate 22 during installation. As has become recently conventional in damper assemblies of the type being described, the damper plate 22 may be provided with an aperture 24, which permits gases tending to accumulate in the damper housing 10 to be vented along flow paths which carry the gases into contact with a temperature sensor mechanism identified generally by reference number 26. The temperature sensing element 26, which resides primarily in the lower part 12, is permitted to project outside the housing 10 through an appropriate opening, not appearing in the drawings, which passes through the surrounding wall of the lower housing part 12 and through a window 28 located in a frame 30, which supports various components to be operatively associated with the operation of the damper plate 22. The frame 30 is preferably formed from a single piece of sheet metal formed to have side walls 31 supported in a spaced apart relation by a generally flat plate portion 40 having an aperture 41 through which passes the shaft 18. The side walls 31 are formed with outwardly projecting flange portions 32 riveted to the housing 10 by means of rivets 34. It can be noted that the several flanges 32 are arranged to straddle the housing bead 13 with the result that some of the rivets 34 engage to the upper housing portion 14, while others of the rivets 34 engage the lower housing portion 12, thus securing the housing 10 against an inadvertent separation of its parts.

Projecting laterally outwardly from the plate portion 40, as it appears in FIG. 1, are integrally formed and spaced apart side plates 42 and 44 which cooperate with the plate 40 to define a chamber 35 for receiving electrical components, including portions of the temperature sensing element 26. This component receiving chamber is preferably closed by an appropriately shaped dust cover 46, which is secured to the side walls 31 by fasteners 33 and which is illustrated in fragmentary detail in FIG. 2, 3 and 4.

The lower side plate 44, as it appears in FIG. 1, is preferably provided with a dielectric insert 48 supporting a plurality of upstanding terminal posts 50 to which various electrical connections may be completed.

Affixed to the plate 40 is a mounting socket 52, which is internally threaded to receive a threaded fastener 56. The fastener 56 is utilized to secure to the mounting socket 52 a housing 54 which confines the operating components, not shown, of a conventional switch device having an operating lever or cam follower 58. The cam follower 58 generally follows a cam 60.

The periphery of the cam 60 is defined generally by an arcuate periphery 62 bridged by a flat segment 64. As those skilled in the art well understand, the cam follower 58 is under a pressure when following the arcuate periphery 62, such pressure being relieved to permit the cam follower 58 to activate a switch residing in the housing 54 when the flat segment 64 has moved to alignment with the cam follower 58.

The cam 60 is provided with an aperture 66 sized to receive the damper shaft 18 and the cam, after receiving the shaft 18, is nonrotatively secured to the shaft 18 by means of a securing pin 68 passing diametrically through a suitably located aperture, not shown, in the shaft 18.

Press fitted into the body of the cam 60 at a location eccentric with respect to the aperture 66 is a pin 70 which projects outwardly from the cam 60. The pin 70 is sized to enter an aperture 72 located near one end of a link member 74.

The link member 74 is slidably received in a slot 76 formed in the upper end, as seen in FIG. 1, of an armature 80. The lower end of the link member 74, as it appears in FIG. 2, has a vertically elongated slot 122, which receives a pin 79 mounted as will be later described. The pin 79, while diametrically disposed with respect to the armature 80, has a length substantially exceeding the diameter of the armature 80, so as to confine a helical spring member 84 adjacent a solenoid housing 82. Thus, the uppermost convolution 86 of the helical spring member 84 ordinarily bears against the pin 79.

The solenoid housing 82 is provided with outwardly projecting flange portions 88, which have elongated slots 90. The slots 90 receive threaded fasteners, as shown at 92, which threadedly enter appropriate apertures 94 located in the frame plate 40.

Received in the solenoid housing 82 is a conventional solenoid coil 96, which is preferably connected in series with an appropriately sized rectifier 98.

Figure 2:
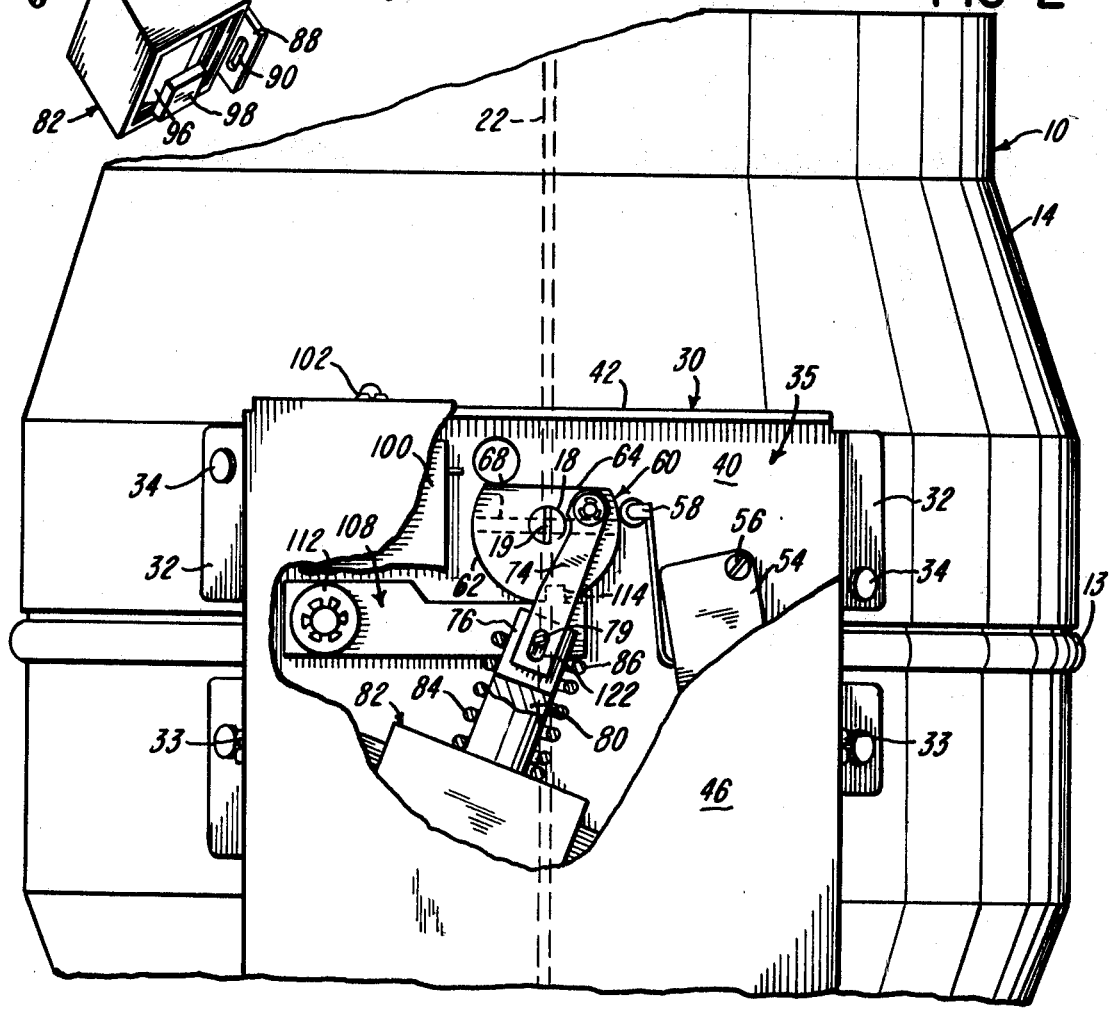
FIG. 2 is an enlarged elevation view of the vent damper mechanism of FIG. 1 with portions broken away to reduce the size of the illustration and to reveal interior detail.

By conventional wiring, not detailed in the drawing, the rectifier 98 is connected to a suitable source of power, not detailed, subject to the control of a relay 100, illustrated schematically in FIG. 2, the relay 100 being mounted under the side plate 42 by means of a suitable fastener 102.

Affixed to the frame plate 40 is a support post 104 terminating remotely from the plate 40 with an annular groove 106. The support post 104 slidably receives a latch plate 108, which is nonremovably secured to the support post by means of a snap ring 112 engaged in the annular groove 106. For purposes of this assembly, the latch plate 108 is provided with an aperture 110 sized to accept the diameter of the support post 104.

As it appears in FIG. 1, the latch plate 108 is provided with an upwardly projecting detent 114 sized to enter an axially disposed, peripherally located slot 116, which resides in the arcuate periphery of the cam 60.

The latch plate 108 is also provided with an elongated slot 118, which receives the diameter of the aforementioned pin 79. The pin 79, which enters an aperture 78 in the armature 80, is preferably provided with a shoulder 120 which is of diameter larger than the width of the elongated slot 118, thus to limit the advance of the pin 79 into the slot 118.

It can be appreciated that the flanges 88 of the solenoid housing 82 bear against the plate 40 associated with the frame 30 upon assembly of the electrical components. Thus, the space permitted between the link member 74 pivotally mounted to the armature 80 and the plate 40 is a rather limited space, which is barely large enough to receive the thickness of the cam 60 together with the link member 74. As is apparent in FIG. 2, the latch plate 108 is disposed below the arcuate periphery of the cam 60 and, being much thinner than the cam 60, the latch plate 108 has ample room for motion in the space underlying the cam 60.

In operation, one can assume that conventional electrical circuitry, not shown, which controls the operation of whatever combustion apparatus is being vented with aid of the present invention has energized the solenoid coil 96 to cause a closure of the damper plate 22. The position of the cam 60, link member 74 and armature 80 immediately prior to such energization is as shown in FIG. 2 and it can there be noted that the initial motion of the armature 80 will be a lost motion with respect to the link member 74 and the damper plate 22 by reason of the longitudinal dimension of the slot 122 residing in the link member 74.

Figure 3:
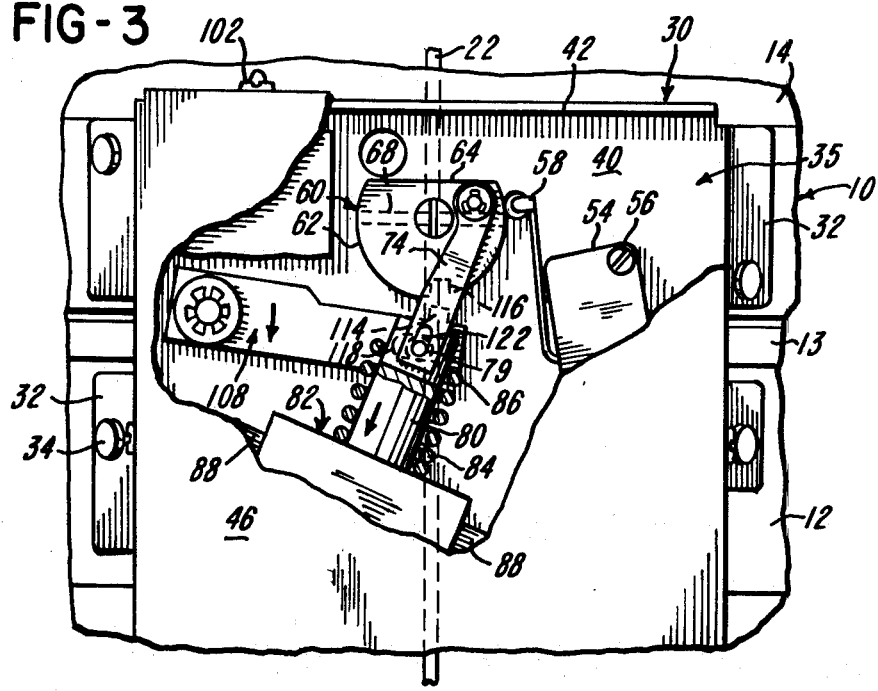
FIG. 3 is an enlarged view analogous to that of FIG. 2 illustrating an intermediate step in the operation of the vent damper mechanism.

However, the pin 79, which passes through the slot 122 and which is engaged in the elongated slot 118 residing in the latch plate 108 will be directly driven by the initial downward stroke of the armature 80. Accordingly, the initial downward stroke of the armature 80, while lost motion as to the link member 74, does positively drop the latch plate 108 so as to disengage the detent 114 from the cam slot 116. The relative positions of the cam 60, the link member 74, the armature 80 and the latch plate 108, at this instant, are substantially as illustrated in FIG. 3. With continued downward movement of the armature 80, as it appears in FIG. 3, the lost motion provided by the link slot 122 is exhausted and thereafter the armature 80 positively drives the link member 74 downwardly, as it appears in FIG. 3, with the result that the cam 60 and with it the damper shaft 18 is rotated in the clockwise direction as appears in FIG. 3.

Thus, the lost motion provided by the elongated slot 122 has been sized to allow the latch plate 108 to be lowered sufficiently to remove the detent 114 from the detent slot 116 before any rotational torque has been applied to the cam 60.

The aforementioned cam follower 58 senses the rotating condition of the cam 60 as the flat segment 64 of the arcuate periphery wipes under the cam follower to relieve pressure thereon. This reaction to the clockwise rotation of the cam 60 affects circuitry, not shown, to disable the combustion apparatus being controlled so that the accumulation of combustion gases which would otherwise become trapped under the damper plate 22 is terminated. Upon completion of the downward stroke of the armature 80, the relative positions of the cam 60, the link member 74, the armature 80 and the latch plate 108 are substantially as disclosed in FIG. 4, and the solenoid coil 96 remains energized to hold the damper plate closed.

Upon initiation of a succedding combustion cycle, the circuitry holding the solenoid housing 82 in its energized condition is disabled so as to de-energize the solenoid coil 96, thus permitting the spring member 84, which had been compressed on the downstroke of the armature 80, to return the armature 80 upwardly.

Figure 4:
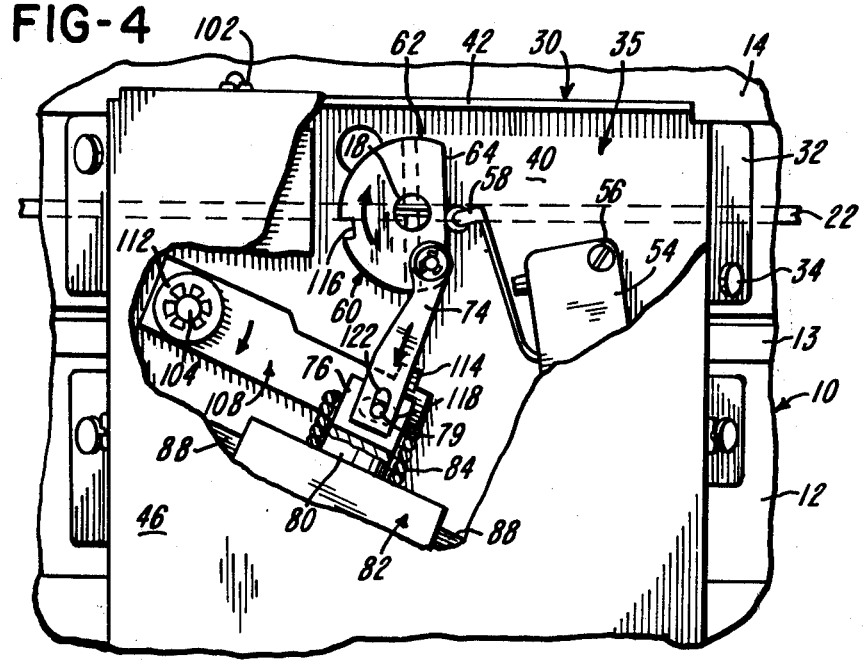
FIG. 4 is an enlarged view analogous to those of FIGS. 2 and 3 illustrating a further step in the operation of the vent damper mechanism.

As evident in FIG. 4, the initial movement induced by the compressed spring member 84 includes a lost motion attributable to the movement of the armature pin 79 along the length of the link slot 122. During such lost motion, the latch plate 108, while advanced upwardly, as viewed in FIG. 4, toward the periphery of the cam 60 is not afforded a sufficient upward movement to allow the detent 114 to engage in the cam slot 116. With continued upward armature movement, the link member 74 is driven by the spring member 84 to rotate the cam 60 in a counterclockwise direction, as viewed in FIG. 4, thus rotating the damper plate 22 toward its open position. This movement is, of course, sensed by the cam follower 58 which functions through its associated switch mechanism located in the housing 54 to initiate combustion as the cam follower 58 wipes onto the arcuate surface of the cam 60.

Ultimately, the upward stroke of the armature 80 powered by the spring member 84 will bring the detent 114 to sliding engagement with the arcuate periphery of the cam 60. At this instant, the spring member 84 is momentarily disabled because its upward thrust is being blocked by the arcuate periphery of the cam 60; however, the upward movement of the link member 74 has imparted to the cam 60 and, more importantly, to the damper plate 22 a rotary momentum which prolongs the rotation of the cam 60 until the cam slot 116 becomes aligned with the detent 114. At this instant, the stored energy then residing in the spring member 84 drives the detent 114 into the cam slot 116 to latch the damper plate 22 in the position illustrated in FIG. 2. Were such latch not available, it would have been necessary to interpose a bumper device, or the like, not shown, to position the damper plate 22 in its open position, and such positioning mechanism would introduce the risk that the damper plate 22 would bounce backwardly and thereby, undesirably, reverse the switch controlled by the cam follower 58. The present invention eliminates the danger of such undesired switch reversal by eliminating the need for a bumper, or the like, to locate the open position for the damper plate 22 and providing in lieu thereof the positive latch mechanism associated with the detent 114.

As is evident from a comparison of FIGS. 2, 3 and 4, the rotation of the cam 60 has the effect of moving the eccentrically connected armature link member 74 away from its initial coaxial relationship to the armature 80. Thus, the rotation of the cam 60 about the axis of the damper shaft 18 necessitates a pivotal motion of the link member 74 about the armature pin 79. The concurrent rotation of the latch plate 108 about the different axis of the support post 104 renders desirable the provision of a second lost motion with respect to the axis of the armature 80. In order to allow this second lost motion, the slot 118 residing in the latch plate 108 has been elongated as is evident in FIG. 1.

Although the preferred embodiment of the present invention has been described, it will be understood that various changes may be made within the scope of the appended claims.

Having thus described my invention, I claim:

1. In a mechanism for positioning a damper member between respective positions opening and substantially closing a flue, said mechanism comprising motive means having an armature, means eccentrically linking said armature to a rotatable cam member drivingly engaged to said damper member, and yieldable means opposing movement of said armature in a first direction for returning said armature in an opposite direction upon de-energization of said motive means; the improvement wherein said cam member has first latching means, and including a latch member and means coupling said latch member to said armature, said latch member having second latching means cooperating with said first latching means to latch said cam member and therewith said damper member following movement of said armature in one of said directions, one of said latching means comprising a latching slot and the other of said latching means comprising a detent.

2. The improvement of claim 1 wherein said means linking said armature to said cam member comprises a link engaging one of said armature and said cam member with lost motion.

3. The improvement of claim 2 wherein said link engages said armature with lost motion.

4. The improvement of claim 2 wherein said cam member is mounted for rotation about a first axis, said latch member is mounted for rotation about a second axis, and including means providing a lost motion connection between said latch means and said armature.

5. The improvement of claim 4 further including a pin traversing said armature, said link having an elongated slot receiving a first portion of said pin to provide the lost motion engagement of said link to said armature, said member providing a lost motion connection between said latch member and said armature comprising a second elongated slot in said latch means receiving a second portion of said pin.

6. The improvement of claim 1 wherein said motive means comprises a solenoid coil, said armature movable linearly through said coil.

7. The improvement of claim 1 wherein said detent enters said latching slot during return of said armature by said yieldable means.

8. The improvement of claim 1 wherein said motive means comprises a coil through which said armature moves linearly, said coil received in a housing having means for mounting the same to a frame plate, said cam member and said linking means interposed between said armature and said frame plate, said latch members interposed between said armature and said frame plate alongside a periphery of said cam member.

9. In a mechanism for controllably venting gases from the flue of a combustion apparatus, said mechanism comprising a housing for mounting to said flue to receive gases therefrom, a damper affixed to a shaft mounted in said housing, moveable between a first position opening said housing for the passage of gases therefrom and a second position substantially closing said housing against the passage of gases therethrough, frame means mounted to said housing, solenoid motor means mounted to said frame means, said frame means including a plate portion having an aperture through which passes said shaft, a cam driveably carried by said shaft and rotatable therewith about a rotary axis, said motor means including an armature, link means engaged to said cam eccentrically with respect to said rotary axis, and means pivotally connecting said link means to said armature; the improvement wherein the pivotal connection of said link means has lost motion with respect to said armature, and including a latch member, means rotatably mounting said latch member to said frame means, means having lost motion connecting said latch member to said armature, said cam having a slot in a periphery thereof, said latch member having a detent for entering said slot, a dust cover, said frame means having side plates engaged to said dust cover and cooperating with said dust cover and with said plate portion to generally enclose said motor means, said cam, said link means and said latch means.

10. In a mechanism for controlling the operation of a combustion apparatus, and venting gases from a flue of such apparatus at times when combustion is occurring, said mechanism comprising a housing for attachment to said flue, a damper plate, means mounting said damper plate in said housing for movement between a first position opening said housing for the passage of gases from said flue and a second position substantially closing said housing to substantially prevent the passage of gases between said housing and said flue, yieldable means for biasing said damper plate to said first position, motor means for driving said damper plate to said second position against the bias of said yieldable means, cam means drivingly connected to said damper plate, and means following said cam means for controlling operation of said combustion apparatus; the improvement wherein said cam means has a first latching portion, and including a second latching portion and means coupling said second latching portion to said motor means for engaging said second latching portion with said first latching portion following movement of said damper plate to said first position.

11. The improvement of claim 10 wherein said first latching portion comprises a slot disposed in a periphery of said cam means and second latching portion comprises a pivotally mounted latch member having a detent for entering said slot.

* * * * *

UNITED STATES PATENT AND TRADEMARK OFFICE
CERTIFICATE OF CORRECTION

PATENT NO. : 4,193,541
DATED : March 18, 1980
INVENTOR(S) : A. Lee Scheidweiler

It is certified that error appears in the above-identified patent and that said Letters Patent are hereby corrected as shown below:

Claim 5, Column 6, line 67, "member" should read --means--

Column 7, line 1, "means" should read --member--

Claim 8, Column 7, line 14, "members" should read --member--

Signed and Sealed this

Fifteenth Day of July 1980

[SEAL]

Attest:

SIDNEY A. DIAMOND

Attesting Officer

Commissioner of Patents and Trademarks